US008935734B2

(12) United States Patent
Govande et al.

(10) Patent No.: US 8,935,734 B2
(45) Date of Patent: Jan. 13, 2015

(54) METHODS, SYSTEMS AND APPARATUS FOR CONFIGURING A SYSTEM OF CONTENT ACCESS DEVICES

(71) Applicant: eBay Inc., San Jose, CA (US)

(72) Inventors: Shailesh Dinkar Govande, Santa Clara, CA (US); Madhura P. Tipnis, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/756,847

(22) Filed: Feb. 1, 2013

(65) Prior Publication Data

US 2014/0223503 A1 Aug. 7, 2014

(51) Int. Cl.
*H04N 7/18* (2006.01)
*H04N 21/6332* (2011.01)

(52) U.S. Cl.
CPC ................ *H04N 21/6332* (2013.01)
USPC .......................................................... 725/82

(58) Field of Classification Search
CPC .......... H04N 21/2343; H04N 21/4122; H04N 21/4126; H04N 21/4135; H04N 21/436; H04N 21/43615; H04N 21/43622; H04N 21/4363
USPC .......................................... 725/74, 78, 80, 82
See application file for complete search history.

(56) References Cited

U.S. PATENT DOCUMENTS

| | | | |
|---|---|---|---|
| 5,187,787 A | 2/1993 | Skeen et al. | |
| 5,305,195 A | 4/1994 | Murphy | |
| 5,347,632 A | 9/1994 | Filepp et al. | |
| 5,390,256 A | 2/1995 | Mandell et al. | |
| 5,187,787 B1 | 5/1996 | Skeen et al. | |
| 5,515,490 A | 5/1996 | Buchanan et al. | |
| 5,572,643 A | 11/1996 | Judson | |
| 5,604,542 A | 2/1997 | Dedrick | |
| 5,666,359 A | 9/1997 | Bennett et al. | |
| 5,706,434 A | 1/1998 | Kremen et al. | |
| 5,727,184 A | 3/1998 | Richter et al. | |
| 5,737,619 A | 4/1998 | Judson | |
| 5,740,549 A | 4/1998 | Reilly et al. | |
| 5,742,602 A | 4/1998 | Bennett | |
| 5,848,415 A | 12/1998 | Guck | |

(Continued)

FOREIGN PATENT DOCUMENTS

| | | |
|---|---|---|
| EP | 0996253 A2 | 4/2000 |
| WO | WO-9707656 | 3/1997 |

(Continued)

OTHER PUBLICATIONS

"U.S. Appl. No. 09/693,867, Examiner Interview Summary mailed Feb. 15, 2005", 1 pg.

(Continued)

*Primary Examiner* — James R Sheleheda
(74) *Attorney, Agent, or Firm* — Schwegman Lundberg & Woessner, P.A.

(57) ABSTRACT

Methods, systems, and apparatus to configure a system of content access devices and direct signals, content, and communications between devices are described. Capabilities of one or more devices are obtained, content formats of a requested content item are obtained, and a source device and a receiving device are determined based on the obtained capabilities and the obtained content formats. A signal and/or content item are directed from the source device to the receiving device.

21 Claims, 6 Drawing Sheets

(56) References Cited

U.S. PATENT DOCUMENTS

| | | |
|---|---|---|
| 5,872,781 A | 2/1999 | Bennett et al. |
| 5,898,833 A | 4/1999 | Kidder |
| 5,903,673 A | 5/1999 | Wang et al. |
| 5,905,885 A | 5/1999 | Richter et al. |
| 5,913,040 A | 6/1999 | Rakavy et al. |
| 5,914,712 A | 6/1999 | Sartain et al. |
| 5,917,816 A | 6/1999 | Jacobsohn |
| 5,933,811 A | 8/1999 | Angles et al. |
| 5,936,960 A | 8/1999 | Stewart |
| 5,937,392 A | 8/1999 | Alberts |
| 5,951,639 A | 9/1999 | MacInnis |
| 5,953,506 A | 9/1999 | Kalra et al. |
| 5,956,716 A | 9/1999 | Kenner et al. |
| 5,956,729 A | 9/1999 | Goetz et al. |
| 5,987,510 A | 11/1999 | Imai et al. |
| 5,999,912 A | 12/1999 | Wodarz et al. |
| 6,006,197 A | 12/1999 | D'Eon et al. |
| 6,006,241 A | 12/1999 | Purnaveja et al. |
| 6,006,265 A | 12/1999 | Rangan et al. |
| 6,009,410 A | 12/1999 | LeMole et al. |
| 6,014,694 A | 1/2000 | Aharoni et al. |
| 6,018,765 A | 1/2000 | Durana et al. |
| 6,023,714 A | 2/2000 | Hill et al. |
| 6,029,200 A | 2/2000 | Beckerman et al. |
| 6,035,339 A | 3/2000 | Agraharam et al. |
| 6,044,408 A | 3/2000 | Engstrom et al. |
| 6,088,732 A | 7/2000 | Smith et al. |
| 6,092,114 A | 7/2000 | Shaffer et al. |
| 6,248,946 B1 | 6/2001 | Dwek |
| 6,288,716 B1 | 9/2001 | Humpleman et al. |
| 6,314,451 B1 | 11/2001 | Landsman et al. |
| 6,314,565 B1 | 11/2001 | Kenner et al. |
| 6,317,761 B1 | 11/2001 | Landsman et al. |
| 6,317,789 B1 | 11/2001 | Rakavy et al. |
| 6,345,279 B1 | 2/2002 | Li et al. |
| 6,415,327 B1 | 7/2002 | Beckerman et al. |
| 6,430,624 B1 | 8/2002 | Jamtgaard et al. |
| 6,442,529 B1 | 8/2002 | Krishan et al. |
| 6,442,758 B1 | 8/2002 | Jang et al. |
| 6,466,967 B2 | 10/2002 | Landsman et al. |
| 6,470,378 B1 | 10/2002 | Tracton et al. |
| 6,496,857 B1 | 12/2002 | Dustin et al. |
| 6,505,160 B1 | 1/2003 | Levy et al. |
| 6,516,338 B1 | 2/2003 | Landsman et al. |
| 6,564,380 B1 | 5/2003 | Murphy |
| 6,594,699 B1 | 7/2003 | Sahai et al. |
| 6,631,498 B1 | 10/2003 | McCauley et al. |
| 6,658,659 B2 | 12/2003 | Hiller et al. |
| 6,738,803 B1 | 5/2004 | Dodrill et al. |
| 6,823,225 B1 | 11/2004 | Sass |
| 6,904,566 B2 | 6/2005 | Feller et al. |
| 6,917,965 B2 | 7/2005 | Gupta et al. |
| 6,976,059 B1 | 12/2005 | Rogalski et al. |
| 6,983,331 B1 | 1/2006 | Mitchell et al. |
| 6,985,932 B1 | 1/2006 | Glaser et al. |
| 6,985,934 B1 | 1/2006 | Armstrong et al. |
| 6,990,514 B1 | 1/2006 | Dodrill et al. |
| 7,085,845 B2 | 8/2006 | Woodward et al. |
| 7,178,161 B1 | 2/2007 | Fristoe et al. |
| 7,188,186 B1 | 3/2007 | Meyer et al. |
| 7,421,482 B2 | 9/2008 | Armstrong et al. |
| 7,747,708 B2 | 6/2010 | Armstrong et al. |
| 8,060,625 B2 | 11/2011 | Armstrong et al. |
| 8,417,820 B2 | 4/2013 | Armstrong et al. |
| 2002/0191116 A1* | 12/2002 | Kessler et al. ............. 348/723 |
| 2003/0018978 A1 | 1/2003 | Singal et al. |
| 2003/0177269 A1 | 9/2003 | Robinson et al. |
| 2004/0103297 A1 | 5/2004 | Risan et al. |
| 2005/0166136 A1 | 7/2005 | Capps et al. |
| 2006/0026612 A1 | 2/2006 | Lee et al. |
| 2006/0242275 A1 | 10/2006 | Shapiro |
| 2007/0027983 A1* | 2/2007 | Bowra et al. ............. 709/224 |
| 2007/0088862 A1 | 4/2007 | Burkman et al. |
| 2007/0100787 A1 | 5/2007 | Lim et al. |
| 2008/0098452 A1* | 4/2008 | Hardacker et al. ............ 725/153 |
| 2008/0104205 A1 | 5/2008 | Armstrong et al. |
| 2008/0120344 A1 | 5/2008 | Armstrong et al. |
| 2008/0120683 A1* | 5/2008 | Frazier et al. ............. 725/141 |
| 2008/0177713 A1 | 7/2008 | Armstrong et al. |
| 2008/0183584 A1 | 7/2008 | Armstrong et al. |
| 2008/0216122 A1* | 9/2008 | Pong et al. ............. 725/46 |
| 2008/0228925 A1 | 9/2008 | Armstrong et al. |
| 2013/0227003 A1 | 8/2013 | Armstrong et al. |

FOREIGN PATENT DOCUMENTS

| | | |
|---|---|---|
| WO | WO-9707656 A3 | 3/1997 |
| WO | WO-9815091 A1 | 4/1998 |
| WO | WO-9957657 A1 | 11/1999 |
| WO | WO-9960504 A1 | 11/1999 |

OTHER PUBLICATIONS

"U.S. Appl. No. 09/693,867, Final Office Action mailed Feb. 17, 2004", 7 pgs.

"U.S. Appl. No. 09/693,867, Non Final Office Action mailed Sep. 9, 2003", 5 pgs.

"U.S. Appl. No. 09/693,867, Non Final Office Action mailed Sep. 23, 2004", 7 pgs.

"U.S. Appl. No. 09/693,867, Notice of Allowance mailed Apr. 22, 2005", 4 pgs.

"U.S. Appl. No. 09/693,867, Response filed Jan. 9, 2004 to Non Final Office Action mailed Sep. 9, 2003", 16 pgs.

"U.S. Appl. No. 09/693,867, Response filed Feb. 23, 2005 to Non Final Office Action mailed Sep. 23, 2004", 17 pgs.

"U.S. Appl. No. 09/693,867, Response filed Jul. 19, 2004 to Final Office Action mailed Feb. 17, 2004", 18 pgs.

"U.S. Appl. No. 11/184,774, Final Office Action mailed Aug. 30, 2007", 6 pgs.

"U.S. Appl. No. 11/184,774, Final Office Action mailed Oct. 6, 2006", 7 pgs.

"U.S. Appl. No. 11/184,774, Non Final Office Action mailed Mar. 17, 2006", 6 pgs.

"U.S. Appl. No. 11/184,774, Non Final Office Action mailed Apr. 18, 2007", 5 pgs.

"U.S. Appl. No. 11/184,774, Non-Final Office Action mailed Jan. 23, 2008", 8 pgs.

"U.S. Appl. No. 11/184,774, Notice of Allowance mailed Jun. 6, 2008", 6 pgs.

"U.S. Appl. No. 11/184,774, Response filed Apr. 5, 2007 to Final Office Action mailed Oct. 6, 2006", 11 pgs.

"U.S. Appl. No. 11/184,774, Response filed Apr. 23, 2008 to Non-Final Office Action mailed Jan. 23, 2008", 8 pgs.

"U.S. Appl. No. 11/184,774, Response filed Jul. 18, 2007 to Non Final Office Action mailed Apr. 18, 2007", 14 pgs.

"U.S. Appl. No. 11/184,774, Response filed Sep. 18, 2006 to Non Final Office Action mailed Mar. 17, 2006", 7 pgs.

"U.S. Appl. No. 11/184,774, Response filed Oct. 30, 2007 to Final Office Action mailed Aug. 30, 2007", 17 pgs.

"U.S. Appl. No. 11/966,547 , Appeal Brief filed Apr. 5, 2012", 25 pgs.

"U.S. Appl. No. 11/966,547, Advisory Action mailed Jan. 26, 2012", 3 pgs.

"U.S. Appl. No. 11/966,547, Examiner's Answer to Appeal Brief mailed Aug. 6, 2012", 5 pgs.

"U.S. Appl. No. 11/966,547, Final Office Action mailed Sep. 21, 2010", 10 pgs.

"U.S. Appl. No. 11/966,547, Final Office Action mailed Nov. 4, 2011", 22 pgs.

"U.S. Appl. No. 11/966,547, Non Final Office Action mailed May 5, 2011", 22 pgs.

"U.S. Appl. No. 11/966,547, Non Final Office Action mailed Dec. 2, 2010", 20 pgs.

"U.S. Appl. No. 11/966,547, Non-Final Office Action mailed Apr. 6, 2010", 11 pgs.

"U.S. Appl. No. 11/966,547, Pre-Appeal Brief Request filed Feb. 6, 2012", 5 pgs.

"U.S. Appl. No. 11/966,547, Preliminary Amendment filed Dec. 28, 2007", 4 pgs.

"U.S. Appl. No. 11/966,547, Reply Brief filed Oct. 8, 2012", 11 pgs.

(56) References Cited

OTHER PUBLICATIONS

"U.S. Appl. No. 11/966,547, Response filed Jan. 4, 2012 to Final Office Action mailed Nov. 4, 2011", 17 pgs.
"U.S. Appl. No. 11/966,547, Response filed Mar. 1, 2011 to Non Final Office Action mailed Dec. 2, 2010", 14 pgs.
"U.S. Appl. No. 11/966,547, Response filed Jul. 6, 2010 to Non Final Office Action mailed Apr. 6, 2010", 13 pgs.
"U.S. Appl. No. 11/966,547, Response filed Aug. 5, 2011 to Non Final Office Action mailed May 5, 2011", 18 pgs.
"U.S. Appl. No. 11/966,547, Response filed Nov. 18, 2010 to Final Office Action mailed Sep. 21, 2010", 14 pgs.
"U.S. Appl. No. 11/966,774, Final Office Action mailed Nov. 3, 2009", 10 pgs.
"U.S. Appl. No. 11/966,774, Non-Final Office Action mailed Mar. 13, 2009", 9 pgs.
"U.S. Appl. No. 11/966,774, Notice of Allowance mailed Feb. 19, 2010", 7 pgs.
"U.S. Appl. No. 11/966,774, Notice of Allowance mailed May 7, 2010", 4 pgs.
"U.S. Appl. No. 11/966,774, Preliminary Amendment filed Dec. 28, 2007", 4 pgs.
"U.S. Appl. No. 11/966,774, Response filed Feb. 2, 2010 to Final Office Action mailed Nov. 3, 2009", 10 pgs.
"U.S. Appl. No. 11/966,774, Response filed Aug. 13, 2009 to Non Final Office Action mailed Mar. 13, 2009", 9 pgs.
"U.S. Appl. No. 12/057,663, Advisory Action mailed Feb. 8, 2005", Advisory Action, 3 pgs.
"U.S. Appl. No. 12/057,663, Final Office Action mailed Apr. 19, 2010", 6 pgs.
"U.S. Appl. No. 12/057,663, Final Office Action mailed Nov. 26, 2010", 5 pgs.
"U.S. Appl. No. 12/057,663, Non Final Office Action mailed Mar. 22, 2011", 6 pgs.
"U.S. Appl. No. 12/057,663, Non Final Office Action mailed Nov. 3, 2009", 9 pgs.
"U.S. Appl. No. 12/057,663, Non-Final Office Action mailed Jul. 26, 2010", 6 pgs.
"U.S. Appl. No. 12/057,663, Notice of Allowance mailed Jun. 27, 2011", 5 pgs.
"U.S. Appl. No. 12/057,663, Response filed Jan. 25, 2011 to Final Office Action mailed Nov. 26, 2010", 15 pgs.
"U.S. Appl. No. 12/057,663, Response filed Feb. 3, 2010 to Non Final Office Action mailed Nov. 3, 2009", 12 pgs.
"U.S. Appl. No. 12/057,663, Response filed Jun. 15, 2011 to Non Final Office Action mailed Mar. 22, 2011", 7 pgs.
"U.S. Appl. No. 12/057,663, Response filed Jul. 19, 2010 to Final Office Action mailed Apr. 19, 2010", 13 pgs.
"U.S. Appl. No. 12/057,663, Response filed Oct. 25, 2010 to Non Final Office Action mailed Jul. 26, 2010", 11 pgs.
"U.S. Appl. No. 12/057,683, Advisory Action mailed Jun. 8, 2012", 3 pgs.
"U.S. Appl. No. 12/057,683, Advisory Action mailed Jul. 17, 2013", 3 pgs.
"U.S. Appl. No. 12/057,683, Decision on Pre-Appeal Brief Request mailed Aug. 27, 2012", 2 pgs.
"U.S. Appl. No. 12/057,683, Decision on Pre-Appeal Brief Request mailed Sep. 23, 2013", 2 pgs.
"U.S. Appl. No. 12/057,683, Examiner's Answer mailed Feb. 25, 2014", 15 pgs.
"U.S. Appl. No. 12/057,683, Final Office Action mailed Mar. 26, 2012", 23 pgs.
"U.S. Appl. No. 12/057,683, Final Office Action mailed May 7, 2013", 17 pgs.
"U.S. Appl. No. 12/057,683, Final Office Action mailed Aug. 15, 2011", 19 pgs.
"U.S. Appl. No. 12/057,683, Final Office Action mailed Dec. 17, 2010", 14 pgs.
"U.S. Appl. No. 12/057,683, Non Final Office Action mailed Apr. 6, 2011", 18 pgs.

"U.S. Appl. No. 12/057,683, Non Final Office Action mailed Oct. 17, 2011", 22 pgs.
"U.S. Appl. No. 12/057,683, Non Final Office Action mailed Nov. 14, 2012", 14 pgs.
"U.S. Appl. No. 12/057,683, Non-Final Office Action mailed Jun. 21, 2010", 19 pgs.
"U.S. Appl. No. 12/057,683, Pre-Appeal Brief Request filed Jun. 25, 2012", 5 pgs.
"U.S. Appl. No. 12/057,683, Pre-Appeal Brief Request filed Aug. 7, 2013", 5 pgs.
"U.S. Appl. No. 12/057,683, Response filed Jan. 17, 2012 to Non Final Office Action mailed Oct. 17, 2011", 18 pgs.
"U.S. Appl. No. 12/057,683, Response filed Feb. 14, 2013 to Non Final Office Action mailed Nov. 14, 2012", 21 pgs.
"U.S. Appl. No. 12/057,683, Response filed Feb. 25, 2011 to Final Office Action mailed Dec. 17, 2010", 12 pgs.
"U.S. Appl. No. 12/057,683, Response filed May 25, 2012 to Final Office Action mailed Mar. 26, 2012", 20 pgs.
"U.S. Appl. No. 12/057,683, Response filed Jul. 6, 2011 to Non Final Office Action mailed Apr. 6, 2011", 14 pgs.
"U.S. Appl. No. 12/057,683, Response filed Jul. 8, 2013 to Final Office Action mailed May 7, 2013", 15 pgs.
"U.S. Appl. No. 12/057,683, Response filed Aug. 31, 2011 to Final Office Action mailed Aug. 15, 2011", 17 pgs.
"U.S. Appl. No. 12/057,683, Response filed Sep. 21, 2010 to Non Final Office Action mailed Jun. 21, 2010", 11 pgs.
"U.S. Appl. No. 12/057,704, 312 Amendment mailed Feb. 11, 2013", 10 pgs.
"U.S. Appl. No. 12/057,704, Advisory Action mailed Dec. 13, 2010", 3 pgs.
"U.S. Appl. No. 12/057,704, Final Office Action mailed Aug. 1, 2011", 16 pgs.
"U.S. Appl. No. 12/057,704, Final Office Action mailed Oct. 1, 2010", 11 pgs.
"U.S. Appl. No. 12/057,704, Non Final Office Action mailed Feb. 4, 2011", 13 pgs.
"U.S. Appl. No. 12/057,704, Non Final Office Action mailed Apr. 29, 2011", 16 pgs.
"U.S. Appl. No. 12/057,704, Non-Final Office Action mailed Apr. 16, 2010", 13 pgs.
"U.S. Appl. No. 12/057,704, Notice of Allowance mailed Nov. 9, 2012", 14 pgs.
"U.S. Appl. No. 12/057,704, PTO Response to 312 Amendment mailed Mar. 11, 2013", 2 pgs.
"U.S. Appl. No. 12/057,704, Response filed Jan. 3, 2011 to Advisory Action mailed Dec. 13, 2010", 13 pgs.
"U.S. Appl. No. 12/057,704, Response filed May 3, 2011 to Non Final Office Action mailed Feb. 4, 2011 and Apr. 29, 2011", 16 pgs.
"U.S. Appl. No. 12/057,704, Response filed Jul. 16, 2010 to Non Final Office Action mailed Apr. 16, 2010", 12 pgs.
"U.S. Appl. No. 12/057,704, Response filed Oct. 3, 2011 to Final Office Action mailed Aug. 1, 2011", 15 pgs.
"U.S. Appl. No. 12/057,704, Response filed Dec. 1, 2010 to Final Office Action mailed Oct. 1, 2010", 13 pgs.
"U.S. Appl. No. 13/854,777, Preliminary Amendment filed Apr. 3, 2013", 8 pgs.
"BrowserSpy", [Online]. Retrieved from the Internet: <URL: http://web.archive.org/web/20000815064855/www.gemal.dk/browserspy/>, (Accessed Jan. 3, 2007), 1 pg.
"Check Plugins", [Online]. Retrieved from the Internet: <URL: http://web.archive.org/web/19991013061127/http:/javascript.internet.c . . . >, (Accessed Jan. 3, 2007), 2 pgs.
"Detecting the Presence/Version of QuickTime from Web Browsers on Windows", QuickTime 4.1./4.1.2, (Updated on May 1, 2000), 6 Pages.
"International Application Serial No. PCT/US2001/040525, International Search Report mailed Jun. 3, 2002", 3 pgs.
"International Application Serial No. PCT/US2001/040525, International Preliminary Examination Report mailed Sep. 30, 2003", 3 pgs.
"OPERAscript User and Developer Manual", OPERA R&D Team, Information Engineering Dept., CUHK, (Jul. 2000), 25 pgs.
"Spyglass Prism", Spyglass Prism. Concepts and Applications, XP002907213, (Jan. 1, 1997), 8 pgs.

(56) References Cited

OTHER PUBLICATIONS

"Spyglass Prism, Concepts and Applications", (1997), 1-7.

"Windows Media Player: Advanced Scripting for Cross-Browser Functionality", [Online]. Retrieved from the Internet: <URL: http://msdn2.microsoft.com/en-us/library/ms867217.aspx>, (Updated on Nov. 2000), 1 pg.

HKCL Project Group, "Hong Kong Cyber library", [Online]. Retrieved from the Internet: <URL: http://www.hkcl.org/distributions/FAQ.html>, (Apr. 20, 2000), 3 pgs.

Microsoft Corporation, "Adding Windows Media to Web Pages", [Online]. Retrieved from the Internet: <URL: http://msdn.microsoft.com/library/shared/deeptree/asp/toolbar.asp?tbcfg= . . . >, (Dec. 2000), 11 pgs.

Microsoft Corporation, "Detecting a Player on a Consumer's Computer for Windows Media Rights Manager 1", [Online]. Retrieved from the Internet: <URL: http://msdn.microsoft.com/library/en-us/dnwmt/html/clientdet.asp?frame . . . >, (Updated on Jan. 10, 2000), 8 pgs.

* cited by examiner

METHODS, SYSTEMS AND APPARATUS FOR CONFIGURING A SYSTEM OF CONTENT ACCESS DEVICES

TECHNICAL FIELD

The present application relates generally to configuring a system of devices, and more specifically, in one example, to configuring a system of content access devices and directing signals, content, and communications between the devices.

BACKGROUND

A variety of devices are available to provide access to content and communications, including devices that support multimedia information. Computers, mobile devices, personal digital assistants, set-top boxes, tablet computers, television sets, audio systems, home theater systems, and the like provide access to content, such as high definition videos, and communications, such as electronic mail. The content and communications may comprise audio, video, text, and/or graphics information and may conform to one or more formats. Content formats include, but are not limited to, the Joint Photographic Experts Group (JPEG) standard, the Moving Picture Experts Group (MPEG) standard, mp3 (MPEG Audio Layer 3), the PDF (portable document format) format, and the like.

The content and communications may be transported between devices via one or more communication protocols. Communication protocols include, but are not limited to, transmission control protocol/internet protocol (TCP/IP), hypertext transfer protocol (HTTP), HDMI (High-definition Multimedia Interface), Bluetooth, and the like.

To provide access to content and communications, each device may support one or more content formats, one or more communication protocols, and one or more communication interfaces. One type of device may support the content format(s) and/or communication protocol(s) required by one type of content, while another device may not support one or more of the required content format(s) and/or communication protocol(s), or may support one or more of the required content format(s) and/or communication protocol(s) in a degraded manner. As a result, some devices may not be capable of providing access to select content or communications, or may only be able to provide access in a degraded manner.

BRIEF DESCRIPTION OF THE DRAWINGS

Some embodiments are illustrated by way of example and not limitation in the figures of the accompanying drawings in which.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for configuring a system of devices and directing signals and content between devices are disclosed. A device may be a computer, a mobile device, a personal digital assistant, a set-top box, a tablet computer, a television set, an audio system, a home theater system, a format converter, a communication converter, a cellular phone, an internet device, a network-based storage device, and the like. As used herein, content, or a content item, is information in one or more formats. Content includes, but is not limited to, video programs, audio programs, text files, electronic mail, and the like. As used herein, a signal may comprise and transport content. For example, a content item may be stored in an MPEG format, and may be streamed between devices via a streaming signal. In another example, a content item may be stored in an MPEG format, and be transferred between devices in a non-streaming mode. The signals and content may comprise one or more of data information, graphics information, audio information, video information, and the like.

As used herein, the term "content" may include communications that comprise content in the form of audio, video, text, and/or graphics information. For example, electronic mail that comprises an audio recording is within the scope of the term "content."

Figure 1:
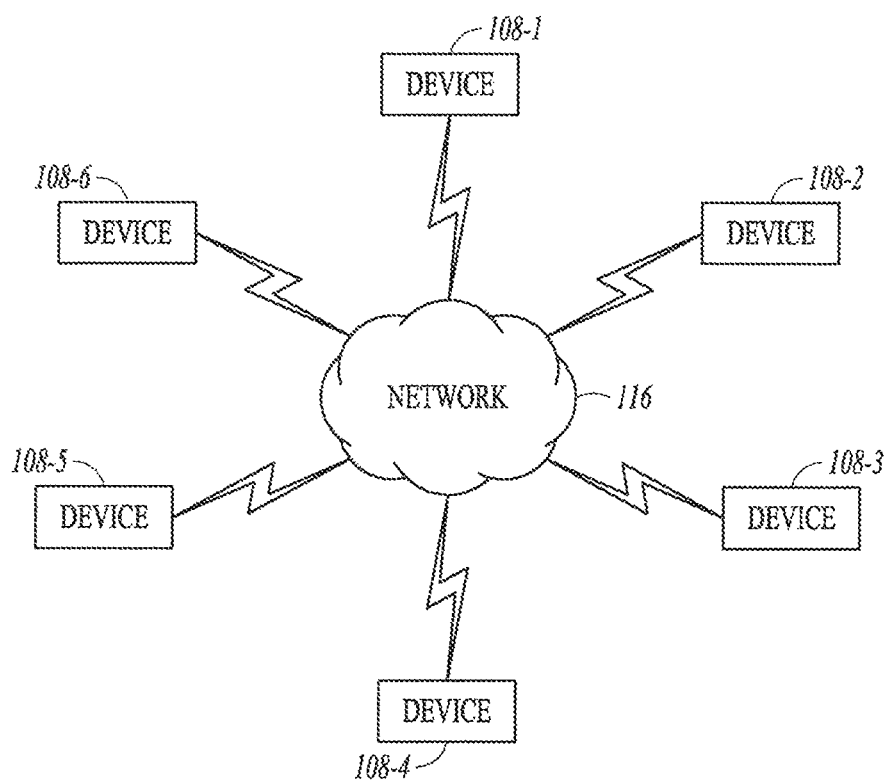
FIG. 1 is a block diagram of an example system, in accordance with an example embodiment, for configuring a system of content access devices.

FIG. 1 is a block diagram of an example system, in accordance with an example embodiment, for configuring a system of content access devices. In one example embodiment, system may comprise one or more content access devices 108-1 through 108-6 (hereinafter, collectively known as devices 108) and a network 116. Each device 108 may be a computer, a mobile device, a personal digital assistant, a tablet computer, a set-top box, a cellular phone, an internet device, and the like. Devices may communicate via network 116, and/or via communication links (not shown) that directly connect two devices 108. The network 116 may be a local area network (LAN), a wireless network, a metropolitan area network (MAN), a wide area network (WAN), a wireless network, a network of interconnected networks, the public switched telephone network (PSTN), and the like. Communication links include, but are not limited to, Wi-Fi (e.g., IEEE 802.11), Bluetooth, Universal Serial Bus (USB), and the like. In one example embodiment, network 116 may comprise one or more routers and/or device switches (not shown).

In one example embodiment, the network 116 may provide full connectivity between devices and may enable each device 108 to be connected to any other device 108. In one example embodiment, a connection between two instances of devices 108 may not be feasible.

Each device 108 may support one or more content formats, one or more communication protocols, one or more network interfaces, one or more user interfaces, and the like. One type of device may support the content format(s) and/or communication protocol(s) required by one or more types of content, while another device may not support one or more of the required content format(s) and/or communication protocol(s), and/or may support one or more of the content format(s) and/or communication protocol(s) in a degraded manner.

Content being accessed may originate from one or more devices, and may be received by one or more devices. For example, a video signal may originate with a DVD (Digital Versatile Disc) player, and may be received by a television set. In another example, a signal comprising audio and video may originate from two devices, where one device provides the video portion of the signal and another device provides the audio portion of the signal. For example, a television camera may provide a video signal and an MP3 player may provide music (audio). The signal comprising audio and video may be directed to and received by one or more devices, such as a television set.

In another example, content may be distributed in parallel to a plurality of devices. For example, a component video signal may be distributed to a plurality of television sets in parallel. In another example, content may be transported sequentially through a series of devices. For example, if a television set capable of displaying a high definition video signal is not available, a high definition video signal may be directed in a serial fashion from a source device to a down-converter device, and from the down-converter device to a standard definition television set.

In one example embodiment, the capabilities of the devices 108 are obtained prior to determining a configuration of the devices for providing access to content and for directing signals and/or content between devices. In one example embodiment, the capabilities of a device are determined by interrogating the device. In one example embodiment, the capabilities of a device are determined by accessing a centralized directory of devices (not shown). For example, a device such as a tablet computer may maintain a directory of capabilities of one or more devices. In one example embodiment, a user may provide the capabilities of a device. For example, a user may enter the capabilities of a device into a centralized directory of devices.

In one example embodiment, a device may be selected as a base device and one or more devices within a proximity to the base device may be identified, and one or more capabilities of the identified devices may be determined. For example, a device controller application executing on a tablet computer may be able to discover and determine the capabilities of one or more devices within a proximity to the tablet computer via a wireless connection. In one example embodiment, a device controller application may identify and determine the capabilities of one or more devices, and may recommend a configuration of the devices for providing access to a requested content item. For example, a device controller application may determine that a local set-top box is capable of delivering a requested video program in a high definition video format via a High-Definition Multimedia Interface (HDMI) connection, and may recommend that the HDMI output of the set-top box be connected to a television set identified as having an HDMI input. In one example embodiment, a device controller application may schedule and implement the recommended configuration of devices. As used herein, a configuration of devices may define the devices within the configuration, may define the configuration of each device and/or may define the connectivity between the devices.

Figure 2:
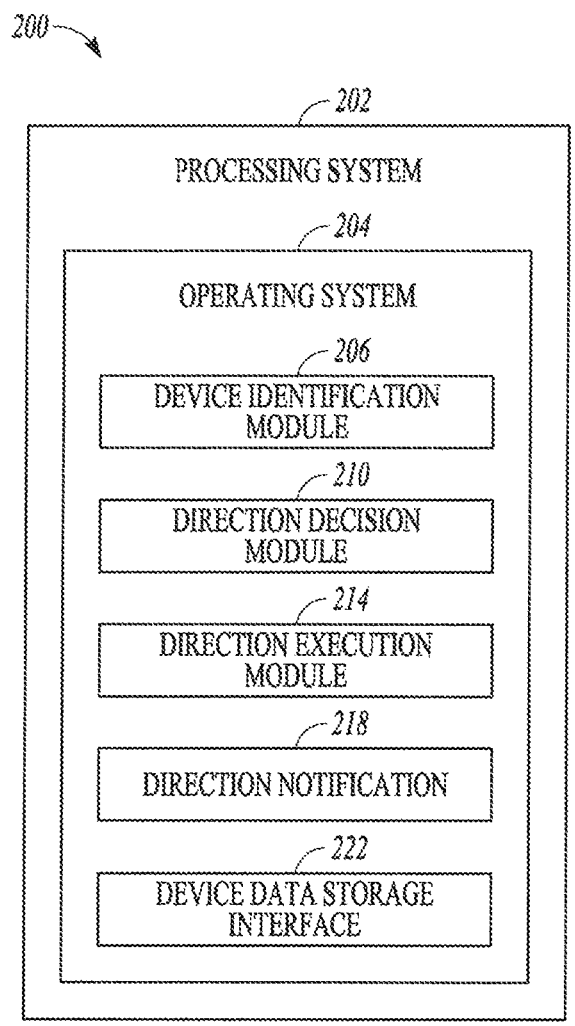
FIG. 2 is a block diagram of an apparatus, in accordance with an example embodiment, for configuring a system of content access devices.

FIG. 2 is a block diagram of an apparatus, in accordance with an example embodiment, for configuring a system of content access devices (such as devices 108 of FIG. 1). In one example embodiment, the apparatus 200 may be a mobile device and may be used to configure a system of content access devices and to direct and/or redirect signals, content, and/or communications and, accordingly, is described by way of example with reference thereto.

The apparatus 200 is shown to include a processing system 202 that may be implemented on a server, client, or other processing device that includes an operating system 204 for executing software instructions. In accordance with an example embodiment, the apparatus 200 may include a device identification module 206, a direction decision module 210, a direction execution module 214, and a direction notification module 218. In accordance with an example embodiment, the apparatus 200 may include a device data storage interface 222 for accessing data that may comprise a list of capabilities of one or more devices.

The device identification module 206 may discover and/or identify devices that may be available for providing access to content. The direction decision module 210 may, for example, evaluate the format(s) of content to be accessed and the capabilities of one or more devices, and may determine a configuration of one or more devices to provide access to the content. The direction execution module 214 may, for example, implement a configuration of one or more devices and/or the connectivity between the one or more devices. The direction notification module 218 may, for example, issue a recommendation for a configuration of one or more devices, or may issue a notification reporting the implementation of a configuration of one or more devices.

Figure 3:
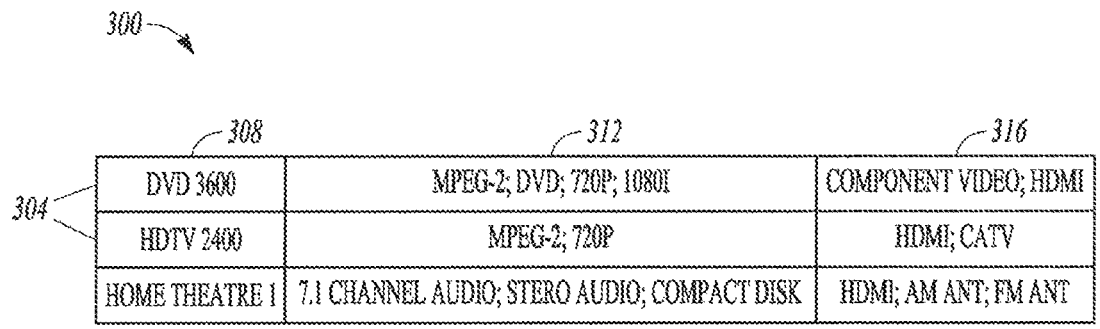
FIG. 3 is an example device data structure comprising device capabilities, in accordance with an example embodiment.

FIG. 3 is an example device data structure 300, in accordance with an example embodiment. Each row 304 of device data structure 300 may correspond to a type of device. Column 308 may be a device type identifier field, column 312 may list content format(s) supported by the corresponding device type, and column 316 may list communication protocol(s) supported by the corresponding device type. For example, the device type DVD 3600 supports MPEG-2 video, DVD disks, 720P MPEG high definition video, and 1080I MPEG high definition video, and supports component video and HDMI (High-definition Multimedia Interface) signals. In one example embodiment, device data structure 300 may comprise a row for each instance of a device type and may comprise an additional device connectivity column (not shown) that may list devices that have connectivity to a particular instance of a device. For example, the device connectivity column may indicate that an instance of device type DVD 3600 only has connectivity with an instance of device type HDTV 2400. In one example embodiment, a recommendation for a configuration may be based on the information in the device connectivity column.

Directing Signals and Content

In one example embodiment, one or more signals and/or content items may be directed from one device to another device based on one or more identified capabilities of the devices. In one example embodiment, "directing" a signal and/or content may be accomplished by issuing a recommendation to route the signal and/or content item from a source device to a destination device. In one example embodiment, "directing" a signal and/or content item may be accomplished by automatically configuring the devices to route the signal and/or content item from a source device to a destination device.

Directing Example

In one example embodiment, one or more signals and/or content items may be directed from one device to another device based on one or more identified device capabilities. For example, a high definition video signal and/or high definition video content item may be directed to a television set identified as being capable of decoding and displaying high definition video.

Redirecting Example

In one example embodiment, one or more signals and/or content items may be redirected from one device to another device based on one or more identified device capabilities. For example, a standard definition video program may be accessed from a tablet computer. The program may then transition to a high definition video format. If the tablet computer does not support a high definition video format, the high definition video program may be redirected to a device identified as being capable of supporting high definition video. For example, a high definition video signal may be redirected from a tablet computer that does not support a high definition video format to a television set identified as being capable of decoding and displaying high definition video.

In one example embodiment, the routing or rerouting of a signal and/or content item may be implemented directly by the source and/or destination devices. For example, a home theatre system with multiple video outputs may redirect a high definition video signal to a port connected to a television set capable of displaying high definition video. In one example embodiment, the routing or rerouting of a signal and/or content item may be executed by a router or device switch interposed between the source device and the sink device. For example, a muter within network 116 (FIG. 1) may route or reroute a high definition video signal from a home theatre system to a television set capable of displaying high definition video.

Configuration Recommendations

In one example embodiment, a notification may be issued that may comprise a recommendation for a configuration of the system to enable access to requested content. For example, the recommendation may be to direct or redirect a signal and/or content item from a source device to a receiving device. The recommendation may be issued, for example, to a user via a tablet computer. In one example embodiment, a push notification may be sent to a mobile device recommending that a direction or redirection of a signal and/or content item be performed. For example, a recommendation may be issued suggesting that a high definition video signal and/or high definition video content item be redirected to a television set identified as being capable of decoding and displaying high definition video. In another example, a recommendation may be issued suggesting that the output of a wireless keyboard be directed to a cellular telephone to facilitate the composition of a message. In one example embodiment, a notification may comprise a plurality of recommendations.

In one example embodiment, a user may be given the option of accepting or rejecting a recommendation. In one example embodiment, if the recommendation is accepted, the recommendation may be automatically implemented. For example, a notification may be sent to a tablet computer and a user may indicate that the recommendation is accepted. In response to receiving the approval, the tablet computer may issue a request to a device switch, the request comprising a description of a configuration of devices. The device switch may connect the devices in the recommended configuration.

Automatic Direction and Redirection

In one example embodiment, a determination may be made to automatically configure the system and to direct or redirect one or more signals and/or content items based on identified capabilities of one or more devices. In one example embodiment, the system may recognize that an active device (i.e., a device currently providing access to content) is incompatible with one or more content format(s) and/or communication protocol(s) of a signal and/or content item that is being accessed and may automatically redirect one or more of the signals and/or content items to a device that is compatible with the corresponding content format(s) and/or communication protocol(s). For example, a system may recognize that video content being displayed by a tablet computer is in a high definition format and may recognize that the tablet computer is not capable of decoding video at a high definition level. The system may therefore automatically redirect the high definition video content to a television set identified as being capable of decoding high definition video. In one example embodiment, the system may also issue a notification to alert a user to the change in configuration of the devices.

In one example embodiment, a signal comprising content in two different formats may be split, and each resulting signal may be directed to a different device. For example, a signal comprising high definition video and stereo audio may be initially routed to a television set capable of decoding high definition video and stereo audio. The video signal may then switch to a program containing high definition video and 7.1 channel audio. The system may recognize that the currently selected television set is not capable of decoding 7.1 channel audio. The system may therefore automatically redirect the audio portion of the signal to a home theatre system identified as being capable of decoding 7.1 channel audio and may continue to direct the video portion of the signal to the television set. The system may also issue a notification to alert a user to the change in the configuration of the devices.

Rule-based Direction

Figure 4:
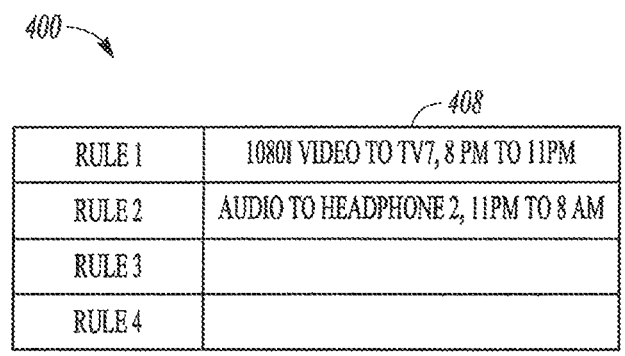
FIG. 4 is an example rule data structure for storing rules, in accordance with an example embodiment.

FIG. 4 is an example rule data structure 400 for storing rules 408, in accordance with an example embodiment. In one example embodiment, a determination may be made to direct or redirect a signal and/or content item based on one or more rules 408. In one example embodiment, a rule may be predefined. In one example embodiment, a rule may be user defined. For example, a user defined rule may indicate that high definition video content should be directed to a television set in a living room if the video content is being accessed between the hours of 8 PM and 11 PM. In one example embodiment, a user-defined rule may indicate that audio should be redirected from a home theatre system to wireless headphones if the audio is being accessed after 11 PM. Rule 1 of FIG. 4 indicates that high definition video content should be directed to a television set (TV7) in a living room if the video content is being accessed between the hours of 8 PM and 11 PM. Rule 2 of FIG. 4 indicates that audio should be redirected to wireless headphones (WH2) if the audio is being accessed after 11 PM.

Configuration Controllers

In one example embodiment, a single base device may determine the system configuration to utilize for accessing a signal and/or content item. In one example embodiment, the determination of the system configuration may be distributed among a plurality of devices. In one example embodiment, the configuration of the device(s) to utilize for accessing a signal and/or content item may be determined by a router or device switch, a device scheduling system, a device controller, a client device, a mobile device and the like. In one example embodiment, the implementation of a configuration of devices and/or the routing of a signal and/or content item may be performed by a router or device switch, a device scheduling system, a device controller, a client device, a mobile device and the like.

Figure 5:
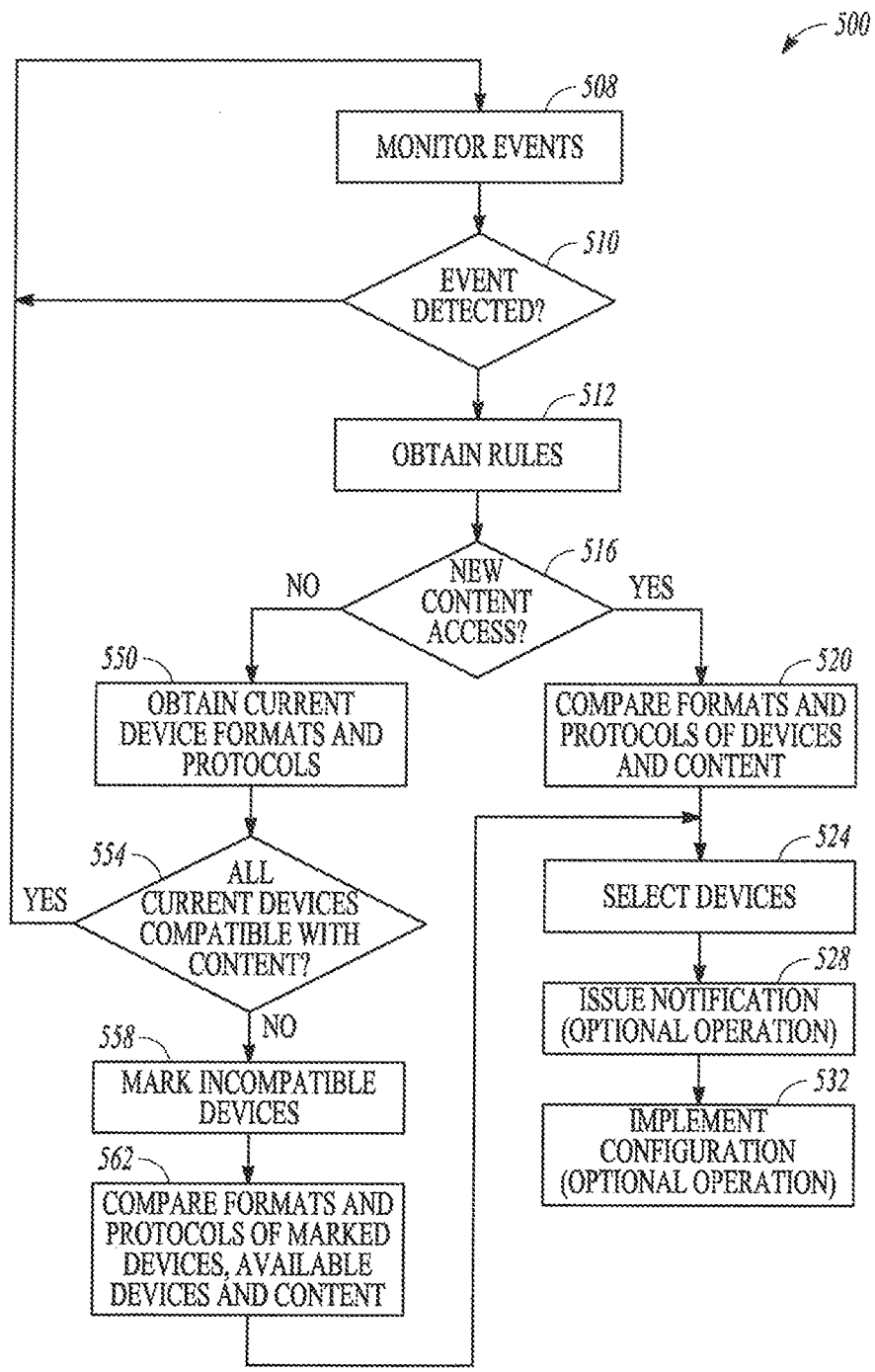
FIG. 5 is a flowchart for a directing method for configuring a system of content access devices, in accordance with an example embodiment.

FIG. 5 is a flowchart for a directing method 500 for configuring a system of content access devices, in accordance with an example embodiment. A network, a communication link and/or one or more devices may be monitored to detect an event (operation 508). An event may be one or more of a request to access content, a change in the format and/or communication protocol of content in the process of being accessed, a configuration change request triggered by a rule, a change in the format and/or communication protocol of one or more signals, and the like.

In one example embodiment, a test may be performed to determine if an event was detected (operation 510). If an event is not detected, operation 508 is repeated and the monitoring operation continues. If an event is detected, one or more optional rules may be obtained (operation 512). For example, a user defined rule may indicate that high definition video content should be directed to a television set in a living room if the video content is being accessed between the hours of 8 PM and 11 PM.

In one example embodiment, a test may be performed to determine if the event is associated with a new access to content or is associated with an existing access to content (operation 516). If the event is associated with an existing access to content, the capabilities of each source device and each receiving device processing the existing access to content are obtained (operation 550) and the method may proceed with operation 554. If the event is associated with a new access to content, the method may proceed with operation 520.

In one example embodiment, during operation 520 (corresponding to processing a new access to content), a comparison of the capabilities of each available device and the content format(s) and communication protocol(s) of the requested content is performed.

In one example embodiment, the most compatible source device(s) and the most compatible receiving device(s) may be selected (operation 524). In one example embodiment, a plurality of the most compatible source devices and a plurality of the most compatible receiving devices are selected. For example, based on a rule, a determination may be made to direct a signal to multiple television sets in parallel if the content is related to a sporting event. In another example, a determination may be made that no available television set is capable of decoding a high definition video signal. A defined rule may therefore trigger the direction of a signal in a serial fashion from a source device to a down-converter device, and from the down-converter device to one of the available standard definition television sets. In one example embodiment, a connection between two instances of devices 108 may not be feasible and the selection of the most compatible source device(s) and the most compatible receiving device(s) (operation 524) may be based, for example, on the connectivity information of the device connectivity column of the device data structure 300. For example, the ability of a device to connect to another device may be considered in determining the selection of the most compatible source device(s) and the most compatible receiving device(s).

In one example embodiment, an optional notification is issued (operation 528). The optional notification may be issued to a user, a client device, a device router, a device switch, a device controller, a device scheduler, and the like. In one example embodiment, the optional notification identifies a system configuration that may be automatically implemented. In one example embodiment, the optional notification comprises a recommendation of a configuration of devices that may be utilized in accessing the requested content. In one example embodiment, the user is given the option of accepting or rejecting the recommendation. In response to obtaining an approval, the implementation of the recommendation may be performed.

In one example embodiment, a system configuration may be implemented (operation 532). In one example embodiment, a router or device switch may be requested or directed to connect the devices in a specific configuration. In one example embodiment, the identified devices may be directly instructed to connect in a specific configuration. For example, a DVD player with multiple output ports, where each output port is connected to a different device, may be instructed to direct a video signal to a specific output port.

In one example embodiment, during operation 554, a test may be performed to determine if each device processing the existing access to content is fully compatible with the content format(s) and/or communication protocol(s) of the requested content. If all devices processing the existing access to content are compatible with the content format(s) and communication protocol(s), the method may transition to operation 508 and the monitoring operation may be performed. If any device processing the existing access to content is not compatible with the content format(s) and communication protocol(s) of the accessed content, then each incompatible device may be marked as a candidate for replacement (operation 558) and the method may transition to operation 562.

In one example embodiment, a comparison of the capabilities of each marked device, each available device, and the content format(s) and communication protocol(s) of the requested content is performed, taking into account the one or more optional rules (operation 562). In one example embodiment, the most compatible source device and the most compatible receiving device are selected. In one example embodiment, a plurality of the most compatible source devices and a plurality of the most compatible receiving devices are selected (operation 524). The method then continues with operation 528, as described more fully above.

Figure 6:
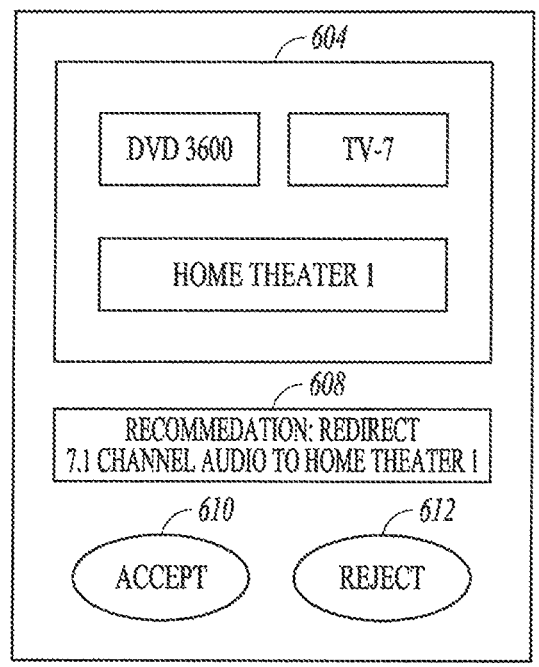
FIG. 6 is an example user interface for configuring a system of content access devices, in accordance with an example embodiment.

FIG. 6 is an example user interface for configuring a system of content access devices. A status section 604 may illustrate a current configuration of the system. A notification section 608 may display incoming recommendations for configuring devices and/or alerting a user to a change in the configuration of devices. An accept button 610 and a reject button 612 may enable a user to approve and implement a recommendation, or to reject the recommendation.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus. e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
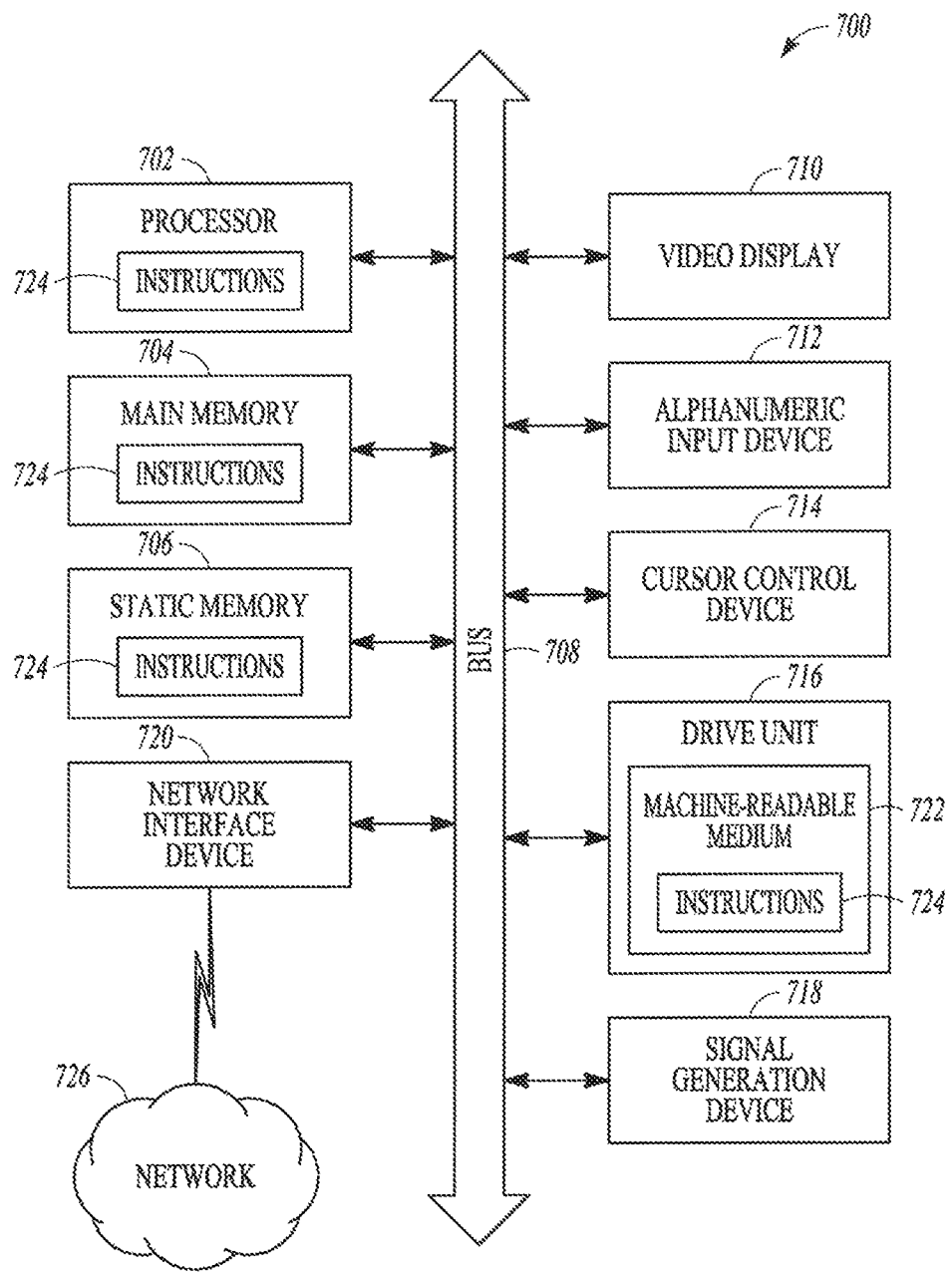
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (cursor control) device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. Instructions 724 may also reside within static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for configuring a system comprising one or more devices, the apparatus comprising:

a processor, and memory to store instructions that, when executed by the processor cause the processor to:
  obtain one or more capabilities of the one or more devices;
  obtain one or more content formats corresponding to a requested content item;
  determine a source device and a first receiving device based on the one or more capabilities, one or more rules, and the one or more content formats, at least one rule specifying that one or more of the source device and the first receiving device is to be selected during a specified time period, the specified time period being selected independent of a time of a scheduled program;
  direct the requested content item from the source device to the first receiving device;
  detecting a change of a format of the requested content item from a firest foramat to a second format; and
  redirecting content to a second reciving device based on the second format.

2. The apparatus of claim 1, wherein the determining is based on one or more communication protocols.

3. The apparatus of claim 1, wherein the directing directs a signal from the source device to the first receiving device.

4. The apparatus of claim 1, wherein the directing terminates one or more of sending from a source device and receiving by a receiving device.

5. The apparatus of claim 1, wherein the directing comprises issuing a notification comprising a configuration of the one or more devices.

6. The apparatus of claim 1, wherein the directing comprises automatically configuring the system.

7. The apparatus of claim 1, wherein the configuring comprises configuring one or more routes between one or more devices.

8. The apparatus of claim 1, wherein the configuring comprises one or more of configuring the source device and configuring the first receiving device.

9. The apparatus of claim 1, wherein the determining is based on one or more pre-defined rules.

10. An apparatus for configuring a system comprising one or more devices, the apparatus comprising:
  a device identification module, performed by a first hardware device, for obtaining one or more capabilities of the one or more devices;
  a direction decision module, performed by a second hardware device, for obtaining one or more content formats corresponding to a requested content item and determining a source device and a first receiving device based on the one or more capabilities, one or more rules, and the one or more content formats, at least one rule specifying that one or more of the source device and the first receiving device is to be selected during a specified time period, the specified time period being selected independent of a time of a scheduled program;
  a direction execution module, performed by a third hardware device, for directing the requested content item from the source device to the first receiving device;
  detecting a change of a format of the requested content item from a first format to a second format; and
  redirecting content to a second receiving device based on the second format.

11. The apparatus of claim 10, wherein two or more of the first hardware device, the second hardware device and the third hardware device are a same hardware device.

12. A method for configuring a system comprising one or more devices, the method comprising:
  obtaining one or more capabilities of the one or more devices;
  obtaining one or more content formats corresponding to a requested content item;
  determining a source device and a first receiving device based on the one or more capabilities, one or more rules, and the one or more content formats, at least one rule specifying that one or more of the source device and the first receiving device is to be selected during a specified time period, the specified time period being selected independent of a time of a scheduled program;
  directing the requested content item from the source device to the first receiving device;
  detecting a change of a format of the requested content item from a first format to a second format; and
  redirecting content to a second receiving device based on the second format.

13. The method of claim 12, wherein the determining is based on one or more communication protocols.

14. The method of claim 12, wherein the directing directs a signal from the source device to the first receiving device.

15. The method of claim 12, wherein the directing terminates one or more of sending from a source device and receiving by a receiving device.

16. The method of claim 12, wherein the directing comprises issuing a notification comprising a configuration of the one or more devices.

17. The method of claim 12, wherein the directing comprises automatically configuring the system.

18. The method of claim 12, further comprising configuring one or more routes between one or more devices.

19. The method of claim 12, wherein the configuring comprises one or more of configuring the source device and configuring the first receiving device.

20. The method of claim 12, wherein the determining is based on one or more pre-defined rules.

21. A non-transitory computer-readable medium embodying instructions that, when executed by a processor, perform operations comprising:
  obtaining one or more capabilities of the one or more devices;
  obtaining one or more content formats corresponding to a requested content item;
  determining a source device and a first receiving device based on the one or more capabilities, one or more rules, and the one or more content formats, at least one rule specifying that one or more of the source device and the first receiving device is to be selected during a specified time period, the specified time period being selected independent of a time of a scheduled program;
  directing the requested content item from the source device to the first receiving device;
  detecting a change of a format of the requested content item from a first format to a second format; and
  redirecting content to a second receiving device based on the second format.

* * * * *

UNITED STATES PATENT AND TRADEMARK OFFICE
CERTIFICATE OF CORRECTION

| | | |
|---|---|---|
| PATENT NO. | : 8,935,734 B2 | Page 1 of 1 |
| APPLICATION NO. | : 13/756847 | |
| DATED | : January 13, 2015 | |
| INVENTOR(S) | : Govande et al. | |

It is certified that error appears in the above-identified patent and that said Letters Patent is hereby corrected as shown below:

In the claims,

In column 12, line 67, in Claim 1, delete "processor," and insert --processor;--, therefor In column 13, line 18, in Claim 1, delete "firest foramat" and insert --first format--, therefor In column 13, line 19, in Claim 1, delete "reciving" and insert --receiving--, therefor Signed and Sealed this
Twenty-seventh Day of October, 2015

Michelle K. Lee
*Director of the United States Patent and Trademark Office*